United States Patent [19]

Okumura et al.

[11] Patent Number: 5,726,923
[45] Date of Patent: Mar. 10, 1998

[54] MINIMUM/MAXIMUM DATA DETECTOR

[75] Inventors: Yukihiko Okumura; Toshio Miki, both of Yokohama; Tomoyuki Ohya, Yokosuka; Yoshinori Miki, Yokohama, all of Japan

[73] Assignee: NTT Mobile Communications Network Inc., Tokyo, Japan

[21] Appl. No.: 356,276

[22] PCT Filed: Sep. 7, 1994

[86] PCT No.: PCT/JP94/01478

§ 371 Date: Oct. 25, 1995

§ 102(e) Date: Oct. 25, 1995

[87] PCT Pub. No.: WO95/09391

PCT Pub. Date: Apr. 6, 1995

[30] Foreign Application Priority Data

Sep. 27, 1993 [JP] Japan ................................. 5-240148

[51] Int. Cl.[6] ............................................................. G06F 7/00
[52] U.S. Cl. .............................................................. 364/715.06
[58] Field of Search ........................ 364/715.06; 340/146.2

[56] References Cited

U.S. PATENT DOCUMENTS

| 4,857,882 | 8/1989 | Wagner et al. | 340/146.2 |
| 5,532,948 | 7/1996 | Kohno et al. | 340/146.2 |

FOREIGN PATENT DOCUMENTS

| 60-108973 | 6/1985 | Japan . |
| 60-110036 | 6/1985 | Japan . |
| 60-220424 | 11/1985 | Japan . |
| 64-48126 | 2/1989 | Japan . |
| 3-116226 | 5/1991 | Japan . |

OTHER PUBLICATIONS

"DSP56000/DSP56001 Digital Signal Processor User's Manual", Motorola, Inc., 1990.
"TMS320C5x User's Guide", Texas Instruments, Inc., 1991.
"MN1920 series LSI Instruction Manual", Matsushita Electronics Corp., 1992.

*Primary Examiner*—Tan V. Mai
*Attorney, Agent, or Firm*—Scully, Scott, Murphy and Presser

[57] ABSTRACT

A minimum/maximum data detector for rapidly detecting the minimum or the maximum data from a plurality of numeric data. In FIG. 1, one of consecutive numeric data stored in memory 1 is read out by an address designated by a register 2, and is transferred to registers 5 and 6. A counter 9 counts up the number of numeric data which have been stored in register 6. The contents of the registers 5 and 11 are compared by a circuit 4. When detecting minimum data, if the contents of the register 5 are judged to be smaller, the contents of the register 6 and the counted results of the counter 9 are linked in an index linking circuit 10. The linked result is then stored in the specific register 11. The content of the register 2 is incremented by "1" whenever the comparison is executed. Once the read out of one series of consecutive numeric data have been completed, then the numeric data remaining in the specific register 11 is the minimum data. The address of the minimum data in the memory 1 can be obtained by adding the index (counted results) and the top address utilized at the beginning of the detection.

5 Claims, 8 Drawing Sheets

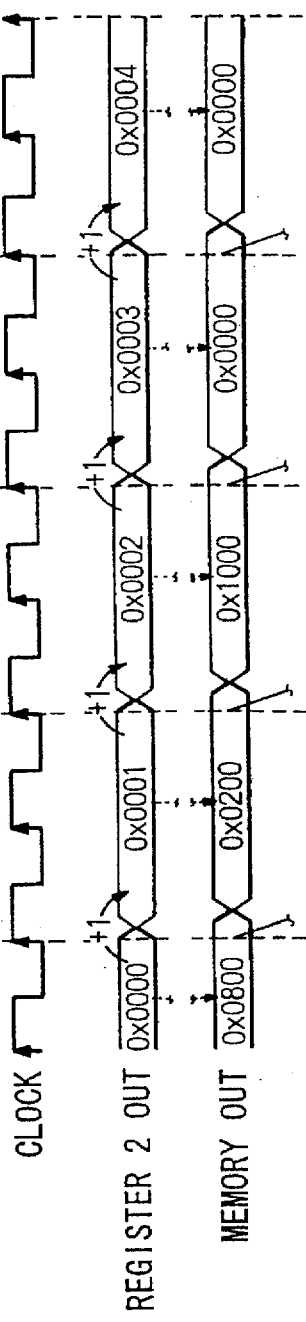
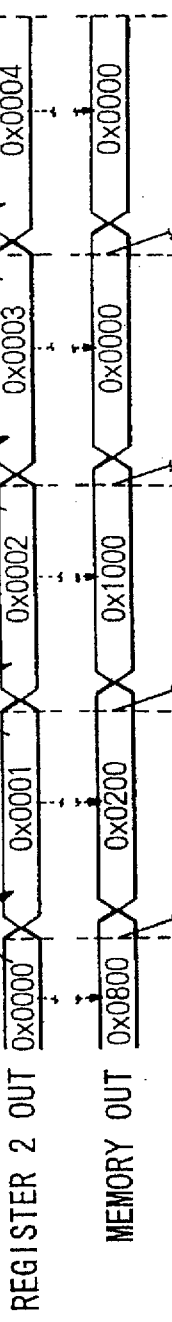
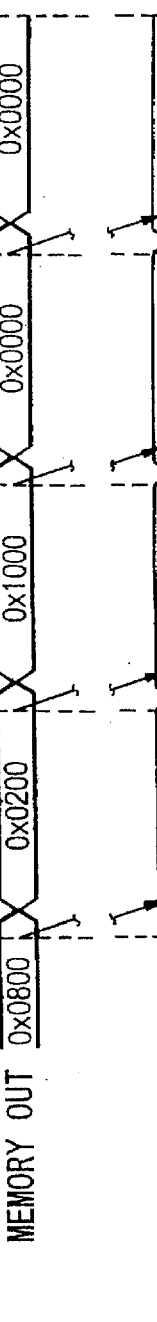
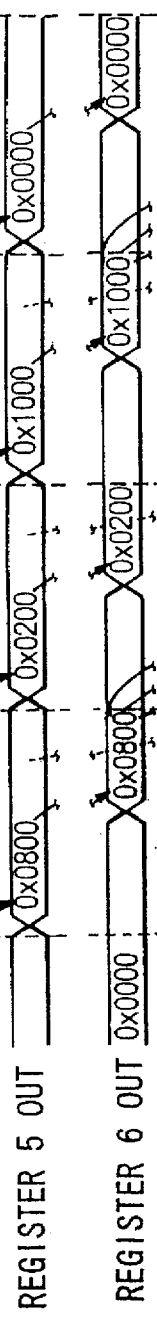
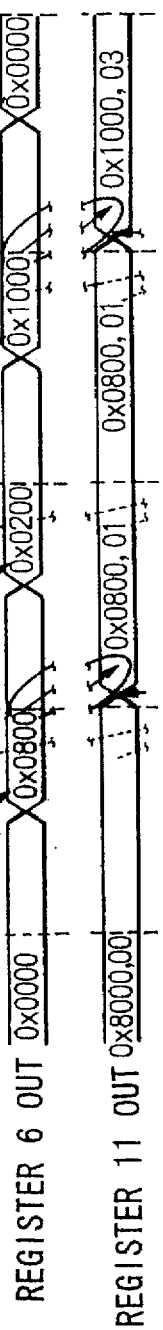
FIG. 7A REPEAT CYCLE
FIG. 7B CLOCK
FIG. 7C REGISTER 2 OUT
FIG. 7D MEMORY OUT
FIG. 7E REGISTER 5 OUT
FIG. 7F REGISTER 6 OUT
FIG. 7G SPECIFIC REGISTER 11 OUT
FIG. 7H RESULT OF THE COMPARISON
※ DATA INPUT FOR EACH REGISTER IS EXECUTED AT CLOCK ONSET FIG. 8A REPEAT CYCLE
FIG. 8B CLOCK
FIG. 8C REGISTER 2 OUT
FIG. 8D MEMORY OUT
FIG. 8E REGISTER 3 OUT
FIG. 8F REGISTER 5 OUT
FIG. 8G REGISTER 6 OUT
FIG. 8H ACCUMULATOR 7 OUT
FIG. 8I RESULT OF THE COMPARISON

※ DATA INPUT FOR EACH REGISTER IS EXECUTED AT CLOCK ONSET

MINIMUM/MAXIMUM DATA DETECTOR

DESCRIPTION

1. Technical Field

The present invention relates to a minimum/maximum data detector for rapidly detecting the minimum or the maximum data from a plurality of numeric data.

2. Background Art

Conventionally, the detection of minimum or maximum dam has generally been carried out using a program on a digital signal processor (hereinafter abbreviated as "DSP"). In order to carry out the detection more quickly, a DSP is used which is provided with specific instructions for executing comparisons of numeric data and carrying out data transfer (i.e., conditional transfer) based on the results of the comparison.

FIG. 5 shows a data ALU in a conventional DSP that executes comparison and conditional transfer according to the specific instructions. The data ALU comprises a memory 1 for storing consecutive numeric data; a register 2 for designating the address when reading out the content of memory 1; and a register 3 for storing an address of memory 1, the address designating the minimum or the maximum data. The memory 1 and registers 2 and 3 are connected to a data bus 20. Furthermore, an input terminal of an arithmetic logic unit 4 for executing the comparison, registers 5 and 6 for storing numeric data to be compared, and the output terminal of an accumulator (which can be replaced by another register) 7 are also connected to the data bus 20. The register 5 is connected to another input terminal of the arithmetic logic unit 4. The operation sequences of various functional circuits are controlled by a control circuit 8 based on the comparison results.

The functional circuits in FIG. 5 can exchange data via a data bus 20 having an arbitrary bit width in response to commands supplied by a program controller furnished in the DSP. The details of the program for detecting the minimum/maximum data utilizing the above-described circuit .Will be described below with the flowchart in FIG. 6. It should be noted that the flowchart in FIG. 6 is not intended to show a strict order of the processes, but is meant to facilitate comprehension of the processes. For example, even if the flowchart indicates that a plurality of steps are executed sequentially, the steps may in fact be executed simultaneously, in a common machine cycle. Therefore, the scope of the processes executed in one machine cycle is also written in the flowchart. Furthermore, data change timings for the various data are shown in FIG. 8.

In FIG. 8, it is assumed that the memory 1 stores numeric data "0×0800," "0×0200," "0×1000" and "0×0000" in its addresses "0×0000" to "0×0003," respectively. The numeric data are read out sequentially and the maximum data "0×1000" will finally remain in the accumulator 7.

The details of the flowchart in FIG. 6 will now be described. First, a prespecified initial value is stored in the accumulator 7 (S31). When detecting minimum data, the initial value is preferably the maximum value within the expressible scope of the numeric data. For example, if the numeric data are expressed by "16" bits width two's complement data, the initial value is preferably "0×7FFF." In contrast, when detecting maximum data, the initial value is preferably the minimum value within the expressible scope of the numeric data (for example, "0×8000"). The following description presumes detection of minimum data.

Next, the top address of the data stored in the memory 1 is stored in the registers 2 and 3 (S32). Next, the number of the numeric data is stored in a loop counter, the counter being furnished in the control circuit 8, for setting the number of repeats when a repeat control is executed (S33). The first numeric datum (i.e., the numeric datum stored in the address shown by the register 2) is stored in the register 5 (S34), and the content of the register 2 is incremented by "1" (S35).

Next, steps S36 to S43 are repeated a number of times corresponding to the number of the numeric data.

In step S36, the content of the register 5 is transferred to the register 6. In step S37, the contents of the register 5 and the accumulator 7 are compared. Initially, because the accumulator 7 stores the maximum value (for example, "0×7FFF"), the results of the comparison should yield "register 5<accumulator 7." Furthermore, the next numeric datum is stored in the register 5 within the same machine cycle (S38). When detecting minimum data, if the content of the register 5 is smaller than that of accumulator 7, the processes in steps S39 and S40 are executed. More specifically, the content of the register 6 is transferred to the accumulator 7, and the content of register 2 is transferred to register 3. Therefore, the accumulator 7 stores the minimum datum from among the numeric data which were previously stored in the register 6. Furthermore, the register 3 stores the address wherein the minimum datum in the memory 1 is stored.

Next, the register 2 is incremented (S41), and the loop counter is decremented (S42).

When the above-described consecutive processes for one numeric datum are completed, the minimum data and the address of the data in the memory 1 are stored in the accumulator 7 and the register 3, respectively. A judgement is then made as to whether or not the count result of the loop counter is "0," and steps S36 to S43 are repeated until the counted result becomes "0."

As shown in FIG. 6, the consecutive processes for one numeric data can be executed within three machine cycles by utilizing three instructions, namely, "transfer," "compare" and a specific instruction "conditional transfer." Therefore, if these instructions are repeated a number of times corresponding to the number of numeric data, the detection can be executed for all the numeric data.

The above-described operation was intended to detect the minimum data, however, maximum data can be detected in the same way. More specifically, when detecting maximum data, the minimum value (0×8000) is stored in the accumulator 7 in step S31, and steps S39 and S40 are executed only if the content of the register 5 is larger than that of the accumulator 7.

It should be noted that if the arithmetic logic unit 4 is allowed to directly access the contents of memory 1, the register 5 is unnecessary. Therefore, the "transfer" from register 5 to register 6 is not required (transfer from memory 1 to register 6 is required), and the sequences for one datum can be executed in two machine cycles.

Furthermore, if a detection identical to that in FIG. 6 is executed by utilizing general instructions of a DSP only, processing time of five to six machine cycles may be required for each numeric data. Moreover, in addition to the minimum or the maximum data, if "N" detected results aligned in the minor or the major order are required, processing time of "N×(2 to 6)" machine cycles will be required for each numeric datum.

However, if processing time of two to six machine cycles is required for each numeric data, then a great amount of processing time is required when the number of data is considerably large, or repetitive minimum/maximum data detection has to be executed for a plurality of data groups. Accordingly, in order to improve detecting ability, the processing time for one numeric datum should be made as short as possible.

Meanwhile, it is regarded that a minimum/maximum data detector can be composed by means of a specific circuit, namely, a sorter which can be realized easily using a numeric comparator and a multiplier, etc., and which rearranges the order of numeric data supplied thereto in the minor or the major order. However, in such a sorter, merely rearranging the order of the numeric data is inconvenient for vector quantization or codebook searching of a matrix quantization. This is because in such application the sorted numeric data should be specify the position in the original numeric data group.

As described above, the circuit shown in FIG. 5 requires at least two machine cycles for executing steps S37 to S43. In FIG. 8, at the onset of a "repeat cycle 1," output data of the register 2 is transferred to the register 3, and output of the register 6 is transferred to the accumulator 7. It is impossible to execute, so as to improve the processing time for each datum, these operations "1" machine cycle prior to the original timing. The reason for this is that the output data of memory 1 and the output data of register 2 would collide in the data bus 20 because the output data of memory 1 is transferred to register 5 via data bus 20 at the onset of "repeat cycle 3."

DISCLOSURE OF INVENTION

It is accordingly an object of the present invention to solve the above-described problems, and to improve the ability of to detect minimum/maximum data.

In order to solve the problems, according to the present invention, the number of the input numeric data are counted by a counter. The counted result is combined with an input data utilized as an index (i.e., index number) which indicates an input order. Furthermore, data selected according to a comparison and the index of the selected data are stored in a specific register. Then, the content of the specific register and newly input numeric data are compared. In this manner, according to the specific register, the operations corresponding to steps S40 and S41 can be executed simultaneously. Therefore, the processing time is considerably reduced and the detecting ability can be improved greatly. Furthermore, the number of steps required for detection is reduced so that the power consumption of the circuit can also be reduced.

BRIEF DESCRIPTION OF DRAWINGS

FIG. 7 is a timing chart of the first embodiment.

FIG. 8 is a timing chart of a conventional minimum/maximum data detector shown in FIG. 5.

BEST MODE FOR CARRYING OUT THE INVENTION

First Embodiment

Figure 1:
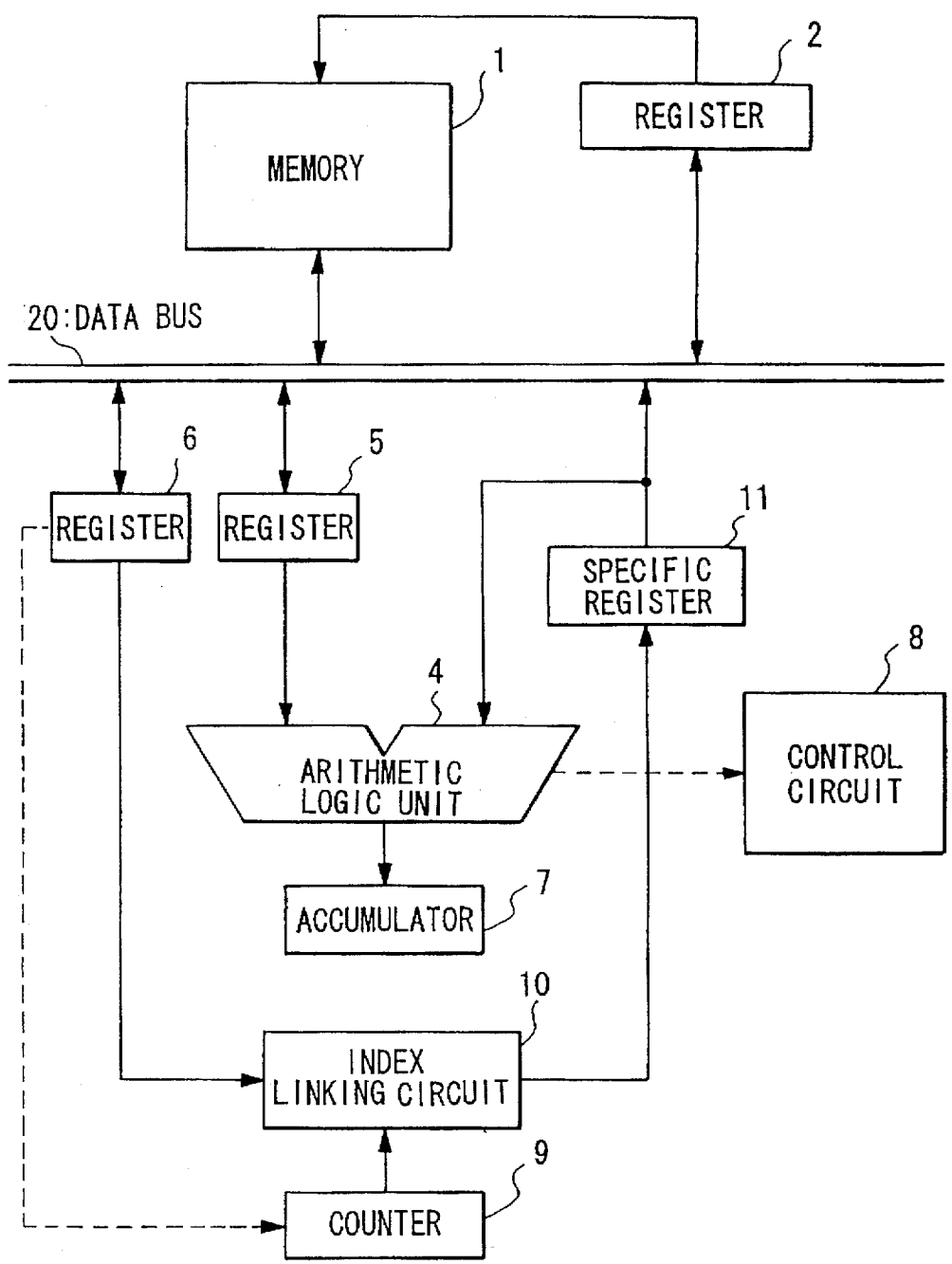
FIG. 1 is a circuit diagram of a minimum/maximum data detector according to a first embodiment of the present invention.
Figure 5:
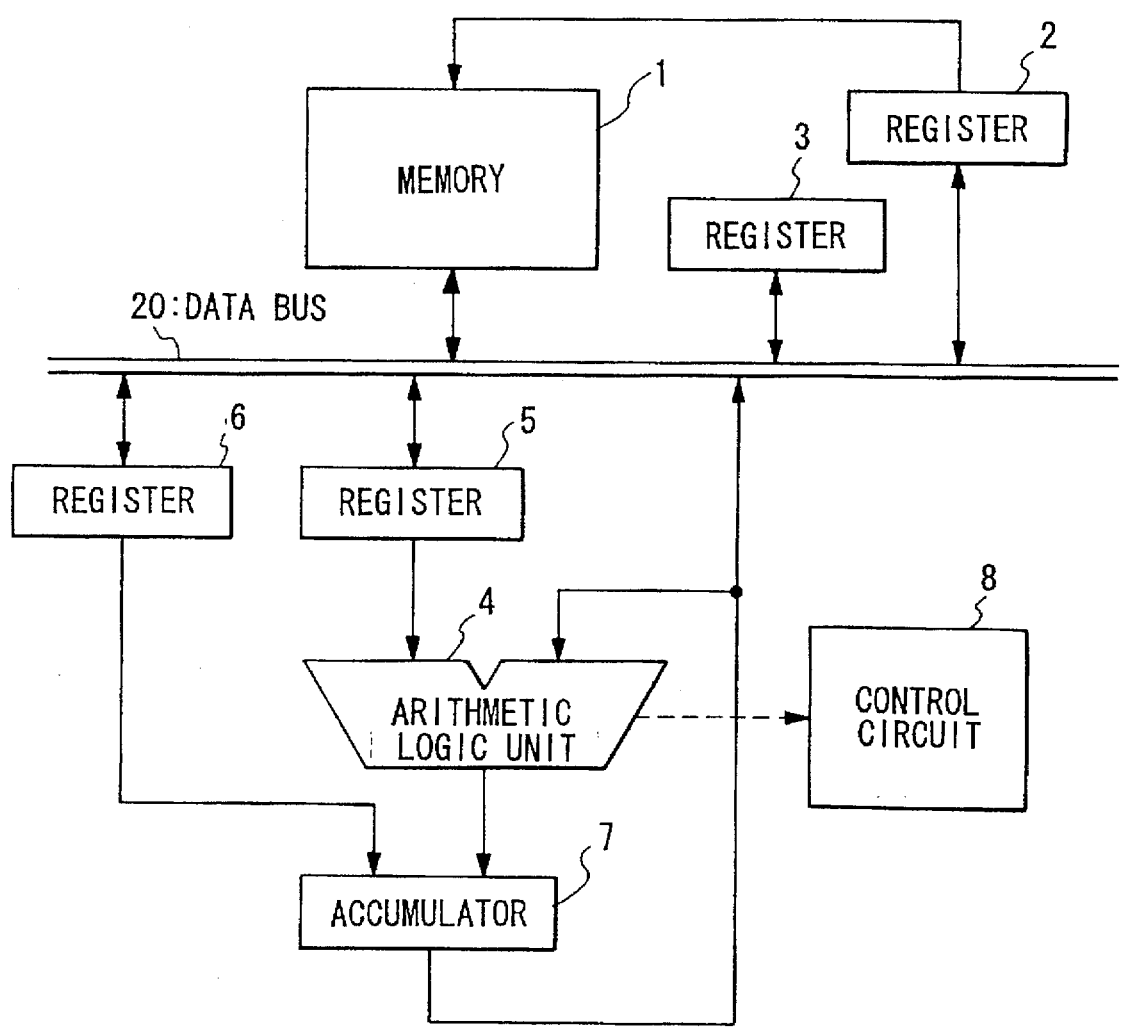
FIG. 5 is a circuit diagram of a conventional minimum/maximum data detector.

FIG. 1 shows a minimum/maximum data detector according to a first embodiment of the present invention. In the drawing, components corresponding to those in FIG. 5 are denoted with the same symbols. In the first embodiment, the register 3 in FIG. 5 is not furnished. The circuit of this embodiment comprises a counter 9 for counting up the number of input numeric data transferred in the register 6; an index linking circuit 10 for linking the counted result of the counter 9 and content of the register 6; and a specific register 11 for storing the linked result of the circuit 10. The numeric data in the specific register 11 and the content of the register 5 are compared by the arithmetic logic unit 4. The counter 9, index linking circuit 10 and specific register 11 are intended to improve the processing time of the repeat process.

Figure 2:
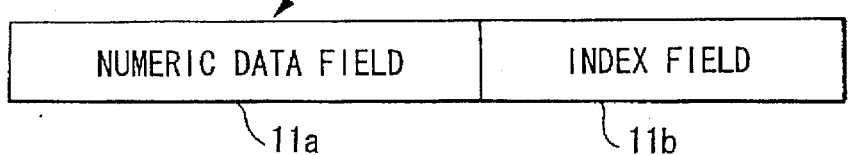
FIG. 2 is a drawing showing a data structure of the specific register 11 furnished in the first embodiment.

The specific register 11 stores new data based on the compared result in the arithmetic logic unit 4. As shown in FIG. 2, the specific register 11 consists of a numeric data field 11a for storing the numeric data, and an index field 11b for storing counted results of the counter 9, namely, the index indicating the input order of the numeric data.

When a comparing process is executed in the arithmetic logic unit 4, an input numeric data stored in the register 5 and the numeric data field of the specific register 11 are compared. In this process, the content of the index field of the specific register 11 is disregarded. However, if the index field is located in the lower figures of the numeric data field, and figure matching between two numeric data is made at the input stage of the arithmetic logic unit 4, then the index field would not affect the comparison results. In other words, the content of the specific register 11 can be supplied to the arithmetic logic unit 4 with its original shape and without separating the numeric data field.

Next, the operation of the circuit shown in FIG. 1 for detecting the minimum data will be described with reference being made to the flowchart in FIG. 3. It should be noted that this flowchart is not intended to show a strict order of the processes, but is meant to facilitate comprehension of the processes. For example, even if a plurality of steps is executed sequentially in the flowchart, the steps may in fact be executed simultaneously in a common machine cycle. Therefore, the scope of the processes executed in one machine cycle is also written in the flowchart. Furthermore, data change timings for the various data are shown in a timing chart in FIG. 7.

Figure 3:
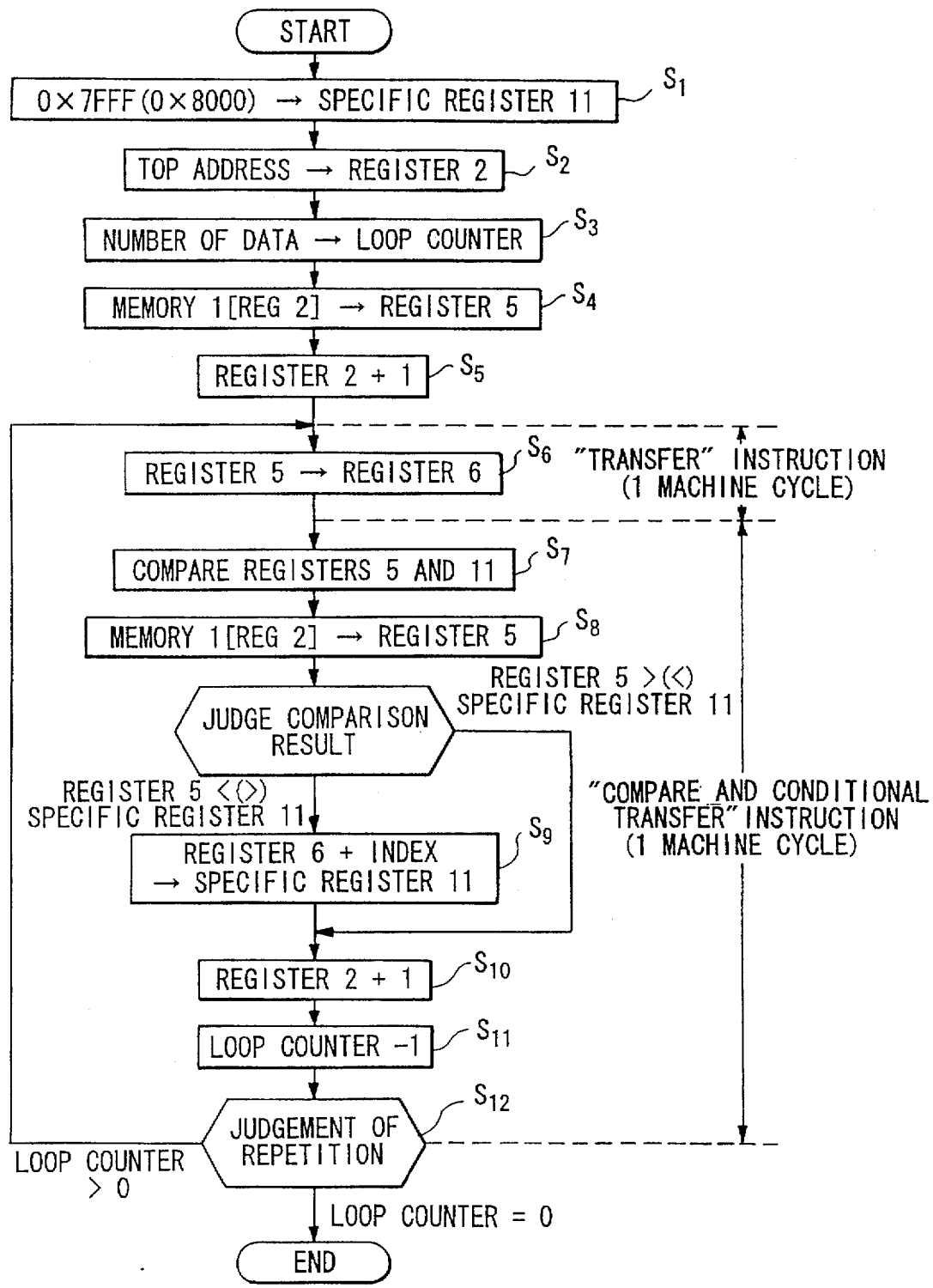
FIG. 3 is a flowchart showing an outlined operation of the first embodiment.
Figure 6:
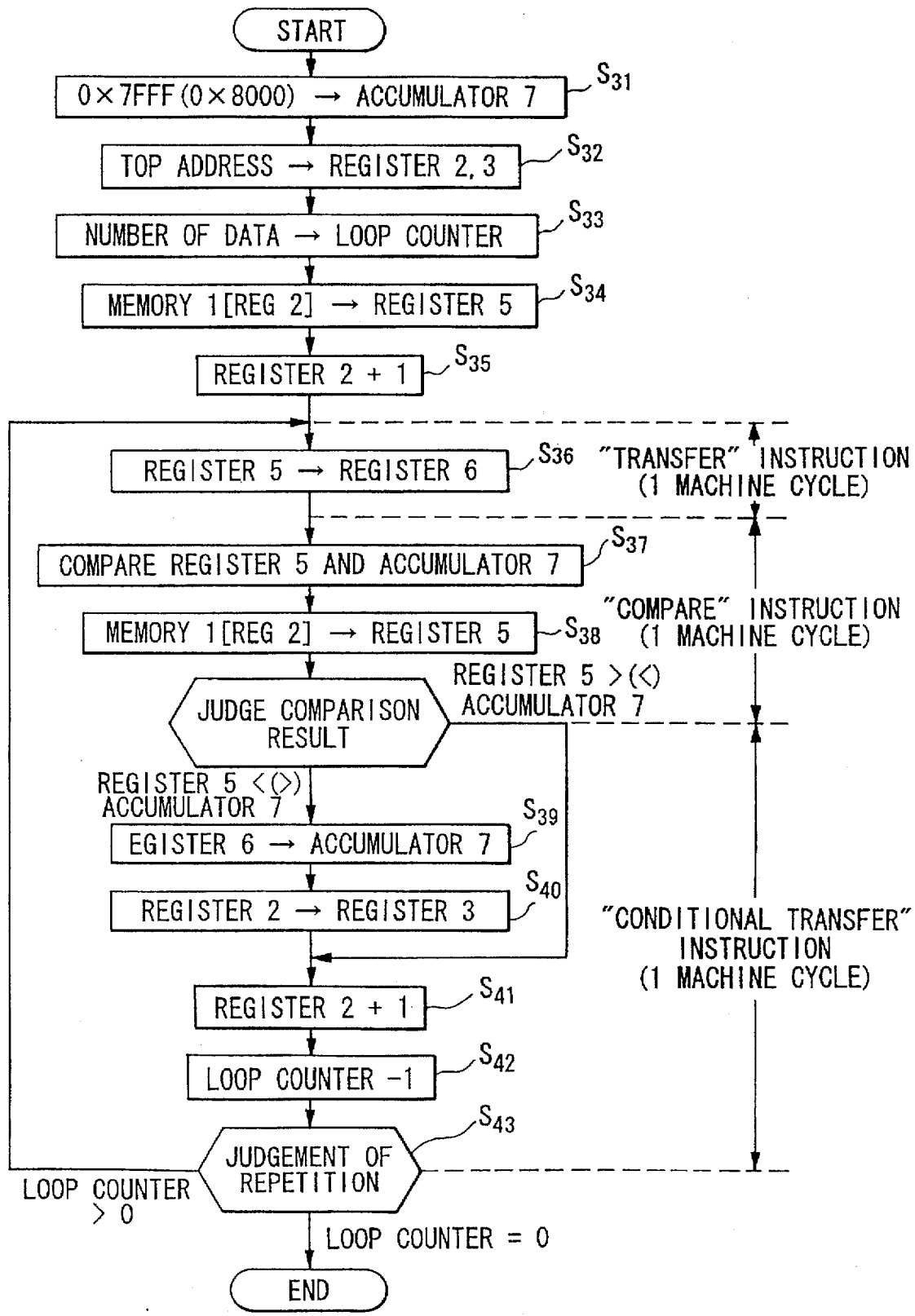
FIG. 6 is a flowchart showing an outlined operation of a conventional minimum/maximum data detector.

In FIG. 3, when the operation is started, an initial value is stored in the specific register 11 in step S1. The initial value is the maximum value (0×7FFF) is identical to step S31 described in the background art (FIG. 6). Next, the process advances to step S2 in which the top address of memory 1 is stored in the register 2. Simultaneously, the counted result of the counter 9 is reset to "0." Then, during steps S3 to S5, operations identical to those in steps S33 to S35 in FIG. 6 are executed. More specifically, the number of numeric data is set in the loop counter which is furnished in the program controller and which stores the number of repeat times (step S3), and the first numeric data which is stored in the memory 1 and the address of which is shown by the register 2 is stored in the register 5 (step S4). Furthermore, the content of the register 2 is incremented by "1" (step S5).

Next, the processes from steps S6 to S12 are repeated. First, in step S6, the content of the register 5 is transferred to the register 6. Furthermore, the counted result of the counter 9 is incremented by "1." Then, in step S7, the contents of the register 5 and those of the specific register 11 are compared. Furthermore, in step S8, the content of the memory 1 is transferred to the register 5. The content of the register 2 is utilized as a readout address while step S8 is executed. Steps S7 and S8 are executed simultaneously. If the compared result of step S7 designates that the content of register 5 is less than the content of specific register 11, step S9 is executed.

In step S9, the content of the register 6 and the counted result of the counter 9 are linked in the index linking circuit 10, and the linked result thereof is stored in the specific register 11. Meanwhile, if the content of the register 5 is judged to be larger than or equal to the content of the specific register 11, step S9 will not be executed.

Accordingly, the numeric data field 11a of the specific register 11 stores the minimum data from among the numeric data previously stored in the registers 5 and 6. Furthermore, the index field 11b of the specific register 11 stores counted results of the counter 9 (i.e., index) corresponding to the minimum data.

The process then advances to step S10 in which the contents of the register 2 are incremented by "1." Furthermore, in step S11, the loop counter furnished in the control circuit 8 is decremented by "1."

When the above-described processes, the consecutive processes for one numeric data, are completed, the minimum data at this time and the address of the minimum data in the memory 1 are stored in the specific register 11. Accordingly, if the processes from steps S6 to S12 are continued until the count result of the loop counter becomes "0" (S12), the minimum data from among all the numeric data is stored in the numeric data field 11a, and the index corresponding to the minimum data is stored in the index field 11b.

The above-described operations are intended to detect the minimum data, however, the maximum data detection can be executed in the same manner. More specifically, in the case of maximum data detection, the minimum value (i.e., 0×8000) within the expressible scope of the numeric data is stored in the numeric data field 11a in step S1, and step S9 should be executed only if the content of the register 5 exceeds the content of the numeric data field 11a.

It is needless to say that the address of the memory 1 storing the minimum or the maximum data can be obtained when the processes shown in FIG. 3 are completed by adding the contents of the index field of the specific register 11 and the top address of the memory 1.

According to the embodiment described above, the register 2 is operated only twice (steps S8 and S10) between steps S7 through S12. Furthermore, because the counted result of the counter 9 is transferred to the specific register 11 without utilizing the data bus 20, the data transfer from memory 1 to register 5 and the data transfer from the counter 9 to the specific register 11 can be executed simultaneously.

Consequently, this embodiment allows "comparing" and "conditional transfer" instructions to be summarized into one specific instruction, and allows one numeric data to be processed within two machine cycles. Furthermore, if the arithmetic logic unit 4 is allowed to directly access the contents of the memory 1, because register 5 is not necessary and the transfer from register 5 to register 6 is not be executed, this embodiment enables the circuit to process one numeric data within one machine cycle.

Second Embodiment

A second embodiment of the present invention will now be described.

Figure 4:
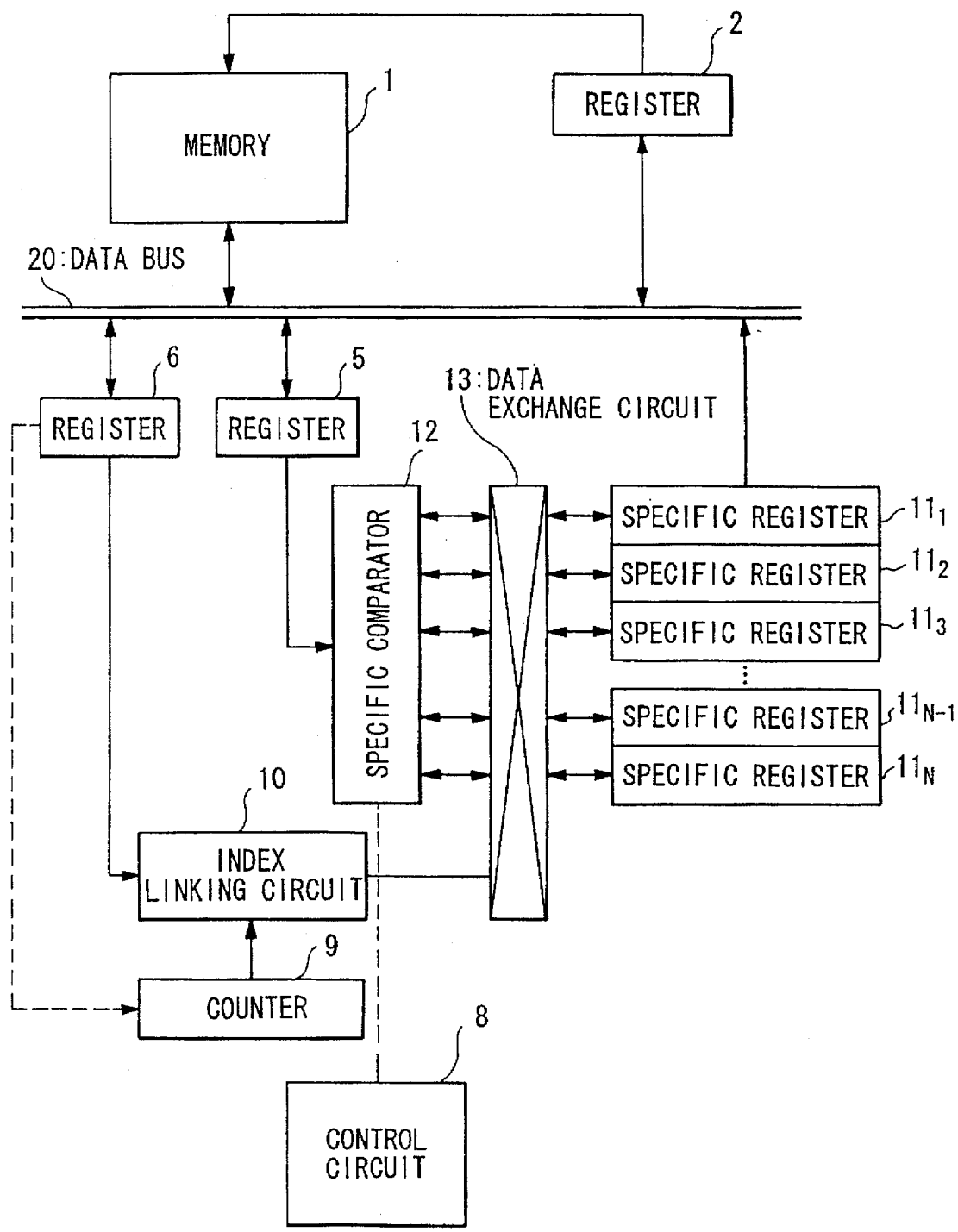
FIG. 4 is a circuit diagram of a minimum/maximum data detector according to a second embodiment of the present invention.

FIG. 4 shows a circuit diagram of this embodiment. In this embodiment, a register group consisting of "N" registers $11_1$ to $11_N$ is provided in place of the specific register 11 in FIG. 1. Furthermore, a specific comparator 12 providing "N" numeric comparators and a data exchange circuit 13 are provided in place of the arithmetic logic unit 4. The numeric comparators compare the content of register 5 and the contents of one of the registers $11_1$ to $11_N$, respectively, and judge which data is larger. The data exchange circuit 13 exchanges the contents of registers $11_1$ to $11_N$ according to these judged results.

More specifically, when carrying out minimum data detection, if the content of the rester 5 is smaller than that of the register $11_1$, the contents of the registers $11_1$ to $11_{N-1}$ are shifted to the registers $11_2$ to $11_N$, respectively, and the data generated by the index linking circuit 10 is stored in the register $11_1$. When the content of the register 5 is larger than or equal to that of register $11_1$, and is less than that of the register $11_2$, the contents of the registers $11_2$ to $11_{N-1}$ are shifted to the registers $11_3$ to $11_N$, respectively, and the data generated by the index linking circuit 10 is stored in the register $11_2$. Similarly, if the content of the register 5 is larger than or equal to those of registers $11_1$ to $11_{N-1}$, and is less than that of the register $11_N$, the data generated by the index linking circuit 10 is stored in the register $11_N$.

Generally, if the content of the register 5 is larger than or equal to the contents of the registers $11_1$ to $11_{M-1}$ and is less than that of the register $11_M$, the contents of the registers $11_1$ to $11_{M-1}$ are shifted to the register $11_{M+1}$ to $11_N$, respectively, and the data generated by the index linking circuit 10 is stored in the register $11_M$. The data previously stored in the register $11_N$ is abandoned.

In contrast, when carrying out maximum data detection, if the content of the register 5 is less than or equal to those of registers $11_1$ to $11_{M-1}$ and is larger than that of the register $11_M$, the contents of the registers $11_M$ to $11_{N-1}$ are shifted to the registers $11_{M+1}$ to $11_N$, respectively, and the data generated by the index linking circuit 10 is stored in the register $11_M$.

The basic composition of the program, detecting the minimum or the maximum data and utilizing the above-described circuit, is identical to that of the program shown in FIG. 3. However, the comparison process executed by the arithmetic logic unit 4 in step S7 is changed to a "simultaneous comparisons" executed by the specific comparator 12. Furthermore, according to the results of the simultaneous comparisons, the contents of the specific registers $11_1$ to $11_N$ and the newly input data are rearranged (in minor order in the minimum data detection, and in major order in the maximum data detection).

In other words, the data exchange circuit 13 designates which register should be inserted into the new data, data in the designated register and the following registers are shifted downward, and the new data is inserted into the designated register. The "N" data detection according to this embodiment also realizes processing time of one to two machine cycles for each numeric data.

The detected results stored in the specific registers $11_1$ to $11_N$ are read out sequentially by means of a specific read out instruction when the repeat process is completed. In this operation, the control circuit 8 issues a command to the specific registers $11_1$ to $11_N$ so that the registers will shift and generate their contents sequentially to the data bus 20.

Figure 9:
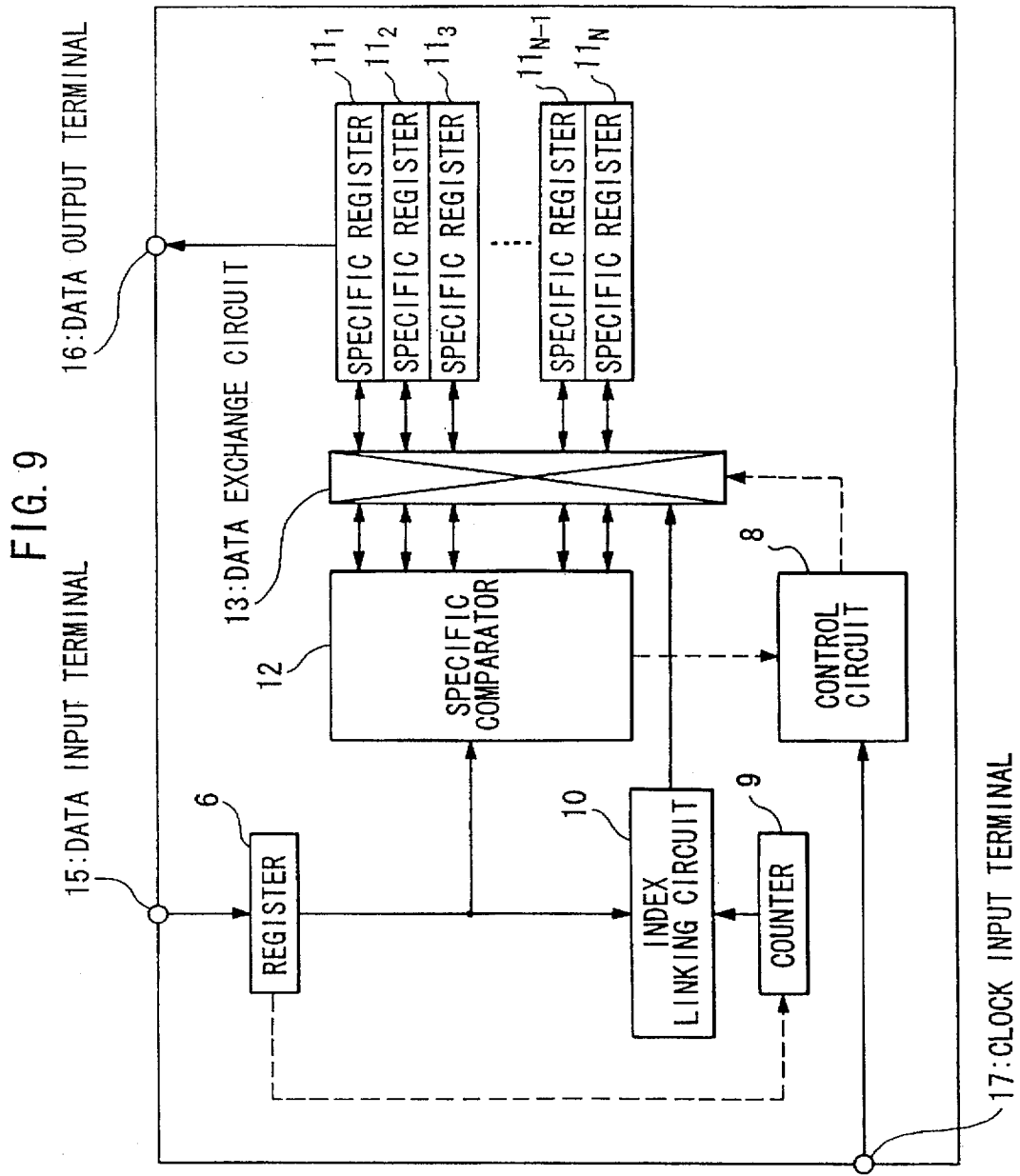
FIG. 9 is a circuit diagram of a modified example of the second embodiment.

The circuit shown in FIG. 4 can be modified to be an independent functional module consisting of specific circuits and containing no general purpose registers or calculation circuits, etc. FIG. 9 shows an example of the module. In the drawing, the symbol 15 designates an input terminal for sequentially receiving numeric data supplied thereto from the outside. The received data are latched in the register 6 and supplied to the specific comparator 12 and the index linking circuit 10, respectively. Furthermore, the control circuit 8 operates in synchronization with a control clock supplied from the outside via a control clock input terminal 17. The symbol 16 designates an output terminal from which the contents of the registers $11_1$ to $11_N$ are read out if necessary. Other components are intended to those in FIG. 4.

When numeric data are supplied sequentially to the input terminal 15, and the control clock is supplied to the terminal 17, "N" detected data in major (or minor) order and the indexes thereof are stored in the registers $11_1$ to $11_N$, respectively.

We claim:

1. A minimum/maximum data detector for detecting the minimum or the maximum data from a plurality of numeric data supplied thereto by comparing said numeric data repeatedly, said minimum/maximum data detector comprising:

a first register for storing said numeric data;

a second register for storing said numeric data transferred from said first register;

a specific register for storing contents of said second register if a prespecified comparison result by a comparator is obtained;

said comparator comparing the contents of said specific register and said first register;

wherein transferring of next numeric data into said first register, and storing of current numeric data into said specific register are executed simultaneously, if said prespecified comparison result is obtained in said comparator.

2. A minimum/maximum data detector according to claim 1, wherein said specific register comprises a plurality of registers for storing a prespecified number of numeric data ranked in minor or major order.

3. A minimum/maximum data detector according to claim 2, further comprising a control circuit for sequentially shifting the contents of said plurality of registers so that said control circuit reads out said prespecified number of numeric data.

4. A minimum/maximum data detector according to claim 2, further comprising:

a memory for storing said plurality of numeric data;

a third register for storing a readout address of said memory;

wherein said first register stores numeric data read out from said memory.

5. A minimum/maximum data detector according to claim 1, further comprising:

a memory for storing said plurality of numeric data;

a third register for storing a readout address of said memory;

wherein said first register stores numeric data read out from said memory.

* * * * *